United States Patent
Chellappa et al.

(10) Patent No.: US 7,662,435 B2
(45) Date of Patent: Feb. 16, 2010

(54) METHOD FOR REDUCING COKING IN A HYDROGEN GENERATION REACTOR CHAMBER

(75) Inventors: Anand Chellappa, Albuquerque, NM (US); Charles Call, Albuquerque, NM (US); Michael Powell, Kennewick, WA (US)

(73) Assignee: Intelligent Energy, Inc., Long Beach, CA (US)

( * ) Notice: Subject to any disclaimer, the term of this patent is extended or adjusted under 35 U.S.C. 154(b) by 807 days.

(21) Appl. No.: 10/712,208

(22) Filed: Nov. 12, 2003

(65) Prior Publication Data

US 2005/0100693 A1 May 12, 2005

(51) Int. Cl.
B05D 1/02 (2006.01)
(52) U.S. Cl. .................. 427/236; 427/239; 427/427
(58) Field of Classification Search ............ 427/236, 427/239, 427
See application file for complete search history.

(56) References Cited

U.S. PATENT DOCUMENTS

| | | | | |
|---|---|---|---|---|
| 4,297,150 | A * | 10/1981 | Foster et al. ............... | 148/276 |
| 4,780,300 | A * | 10/1988 | Yokoyama et al. ........ | 423/418.2 |
| 5,049,883 | A * | 9/1991 | Woodward ................. | 342/12 |
| 5,093,032 | A * | 3/1992 | Reid et al. ................ | 252/400.4 |
| 5,093,540 | A * | 3/1992 | Forschner et al. .......... | 585/324 |
| 5,242,574 | A * | 9/1993 | Broutin et al. ............. | 208/48 R |
| 5,336,828 | A * | 8/1994 | Malhotra et al. ............ | 585/654 |
| 5,593,571 | A * | 1/1997 | Heyse et al. ............... | 208/134 |
| 6,190,623 | B1 * | 2/2001 | Sanger et al. ............... | 422/192 |
| 6,238,816 | B1 * | 5/2001 | Cable et al. ................ | 429/17 |
| 6,258,402 | B1 * | 7/2001 | Hussary et al. ............. | 427/142 |
| 6,361,757 | B1 | 3/2002 | Shikada et al. | |
| 6,444,083 | B1 * | 9/2002 | Steger et al. ............. | 156/345.48 |
| 6,444,259 | B1 * | 9/2002 | Subramanian et al. ...... | 427/191 |
| 6,503,442 | B1 * | 1/2003 | Fukubayashi ............... | 266/270 |
| 6,682,774 | B2 * | 1/2004 | Smith et al. ................ | 427/180 |
| 6,723,379 | B2 * | 4/2004 | Stark ......................... | 427/180 |
| 6,902,628 | B2 * | 6/2005 | Wang et al. ................ | 134/26 |
| 2002/0073982 | A1 * | 6/2002 | Shaikh et al. .............. | 123/688 |
| 2002/0168466 | A1 | 11/2002 | Tapphorn et al. | |
| 2003/0219542 | A1 * | 11/2003 | Ewasyshyn et al. ......... | 427/421 |
| 2004/0045503 | A1 * | 3/2004 | Lee et al. .................. | 118/712 |
| 2004/0118747 | A1 * | 6/2004 | Cutler et al. ............ | 208/208 R |
| 2004/0146640 | A1 * | 7/2004 | Ott et al. ................... | 427/180 |
| 2006/0255100 | A1 * | 11/2006 | Payne et al. ............... | 228/119 |
| 2007/0015002 | A1 * | 1/2007 | Narula et al. .............. | 428/668 |
| 2009/0025291 | A1 * | 1/2009 | Ichikawa et al. ........... | 48/61 |

FOREIGN PATENT DOCUMENTS

DE 19900477 A1 * 7/2000

OTHER PUBLICATIONS

Trimm, D.L., "Catalysts for the control of coking during steam reforming". Catalysis Today, vol. 49, Issues 1-3, Feb. 24, 1999, pp. 3-10.*

(Continued)

*Primary Examiner*—Bret Chen
(74) *Attorney, Agent, or Firm*—Luce, Forward, Hamilton & Scripps, LLP; Mark Krietzman

(57) ABSTRACT

A method of applying a coating the inner surface of a metal reactor chamber whereby coking resulting from the production of hydrogen from reforming hydrocarbons is reduced.

20 Claims, 1 Drawing Sheet

OTHER PUBLICATIONS

Sandia National Laboratories News Releases: "Industry warms up to promises of Cold Spray". Jun. 25, 2001.*

Chang, Jong-San, et al., "Catalytic activity and coke resistance in the carbon dioxide reforming of methane to synthesis gas over zeolite-supported Ni catalysts". Applied Catalysis A: General 145 (1996) pp. 111-124.*

Ruckenstein, Eli, et al., "Carbon dioxide reforming of methane over nickel/alkaline earth metal oxide catalysts". Applied Catalysis A: General 133 (1995) pp. 149-161.*

Papyrin, Anatolli, *Cold Spray Technology, Advanced Materials and Processes*, Sep. 1, 2001, High Beam Research.

Twigg, M.V. (Ed.), *Catalyst Handbook ($2^{nd}$ Edition)*, 1996, Manson Publishing Ltd.

Satterfield, Charles N., *Heterogeneous Catalysis in Industrial Practice ($2^{nd}$ Edition)*, 1991, Krieger Publishing Company, New York.

* cited by examiner

METHOD FOR REDUCING COKING IN A HYDROGEN GENERATION REACTOR CHAMBER

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates generally to surface modification of inner surfaces of a hydrogen generation reactor chamber, and in particular, to the surface modification of the principal surface of the inner surface of a hydrogen generation reactor chamber using a cold spray of material.

2. Description of Related Art

The growing popularity of portable electronic devices has produced an increased demand for compact and correspondingly portable electrical power sources to energize these devices. Developments in robotics and other emerging technology applications are further increasing the demand for small, independent power sources. At present, storage or rechargeable batteries are typically used to provide independent electrical power sources for portable devices. However, the amount of energy that can be stored in storage or rechargeable batteries is insufficient to meet the need of certain applications.

Fuel cells in general and particularly hydrogen/air fuel cells (H/AFCs) have enormous potential as a replacement for batteries. Because fuel cells operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly for portable applications, where small size and low weight are desirable.

A common H/AFC is a polymer electrolyte membrane (PEM) fuel cell. PEM fuel cells are constructed of an anode and a cathode separated by a polymer electrolyte membrane. Functionally, the PEM fuel cells generate electricity by stripping the electrons of hydrogen (forming H+) as the hydrogen from the anode side passes through a PEM membrane, the electrons migrate around the PEM membrane to produce a voltage. The H+ reacts with oxygen at the cathode to produce water.

The Solid Oxide Fuel Cell (SOFC) operates by stripping electrons off oxygen. Negatively charged oxygen ions migrate through an electrolyte membrane and react with hydrogen at the anode to form water.

In both cases, the PEM fuel cell and the SOFC, oxygen can typically be obtained from the ambient atmosphere, only a source of hydrogen must be provided to operate the fuel cell.

Merely providing compressed hydrogen is not always a viable option, because of the substantial volume that even a highly compressed gas occupies. Liquid hydrogen, which occupies less volume, is a cryogenic liquid, and a significant amount of energy is required to achieve the extremely low temperatures required to liquefy gaseous hydrogen. Furthermore, there are safety issues involved with the handling and storage of hydrogen in the compressed gas form or in the liquid form.

One method of producing hydrogen is by processing hydrocarbons such as methane (natural gas), propane, butane, and liquid fuels such as gasoline, diesel and JP-8 or oxygenates such as methanol. The choice of fuel and the choice of the method of processing, such as steam reforming, partial oxidation, and autothermal reforming depends to a large extent on the type of service, such as, portable, stationary or automotive fuel cell power systems. Hydrogen can also be produced by cracking ammonia. The product stream from the fuel processor when a hydrocarbon feed is used contains hydrogen in addition to un-reacted hydrocarbons, other products such as CO, $CO_2$, and diluents such as nitrogen. In essence, the hydrogen concentration in the product stream can be in the 40 to 75 volumetric percent (dry basis) range depending on the type of fuel and the method of processing. Methods such as water gas shift and preferential oxidation are used to reduce the CO concentrations to acceptable levels of no more than 50 parts per million, but increase the complexity of the system.

A challenge in developing low temperature (less than about 650° C.) hydrogen generation systems which reform hydrogen rich fuels such as light hydrocarbons in the $C_1$-$C_4$ range and heavy hydrocarbons such as gasoline, jet fuel and diesel, is that carbon formed as a by-product of mechanisms such as the thermal cracking of the fuels is less prone to be removed by carbon removal mechanisms such as gasification. This problem is particularly severe during the reforming of heavy hydrocarbons. The net result is carbon accumulation in the reactor, commonly known as coking, and has a serious effect on lifetime and reaction efficiencies. The condition is exacerbated if a gasification agent such as hydrogen is removed preferentially during reforming, as is the case when the reformer is operated as a membrane reformer. Operation at low temperatures (<650° C.) therefore necessitates the incorporation of techniques that prevent or minimizes carbon formation in the first place.

Metal surfaces such as those provided by reactor walls and walls of connecting tubing, when untreated, can contain surface oxygen that promote the scission of the C—H bond in hydrocarbons and thereby favors carbon formation and deposition. The deposited carbon, if not removed, serves as nucleation sites for additional deposition of carbon layers. Furthermore, thermodynamics favors the occurrence of carbon formation in the gas phase at conditions that are typically used for hydrogen production. Carbon formation from hydrocarbon raw materials, such as methane, can occur by thermal cracking at temperatures greater than 600° C. and/or from products such as carbon monoxide by the Boudart mechanism, at lower temperatures.

Prior art solutions to reduce coking include steam/carbon feed ratios that are greater than stoichiometric ratios, method of contacting and mixing the hydrocarbon and steam feed, minimizing empty reactor volume, and employing operating temperatures that are greater than 750° C. to favor gasification.

Therefore, it is a desideratum to produce a reactor which reduces carbon formation/coking of the reactor walls and/or connecting tubes.

SUMMARY OF THE INVENTION

According to one embodiment of the present invention, a method for preparing the metal substrate surface of a hydrogen generation reactor chamber to reduce carbon formation is provided.

The method includes exposing a metal substrate to particles in a cold spray using the kinetic energy of the particles, sprayed at a high-velocity flow, to bond the particles to the metal substrate through high-speed plastic deformation of the interacting bodies. Cold spray is taught generally in U.S. Pat. No. 5,302,414 issued to Alkhimov et al., the disclosure of which is herein incorporated by reference in its entirety.

In one embodiment of the invention, a hydrogen generation reactor chamber with at least some portion of the inner principal surfaces coated to reduced carbon formation is taught.

In one embodiment, a method for preparing a hydrogen generation reactor chamber to reduce coking comprises applying a cold spray of an alkaline oxide or an oxide material, such as alumina, silica, zirconia, ceria or mixtures thereof, doped with alkali metal or alkaline earth compounds mixed with small quantity of metal to principal surfaces within the hydrogen generation reactor chamber. The metal is selected form the group consisting of noble metals and alkaline metals. Furthermore, the percentage of metal to alkaline oxide in the cold spray is about 50% to about 90%, respectively.

In particular embodiments, the hydrogen generation reactor chamber can be comprised of aluminum, stainless steel, titanium and/or other high temperature refractory alloys suitable for hydrogen generation. The choice of metal would depend on the operating temperature employed for generating hydrogen. In some embodiments the hydrogen generation reactor chamber is further comprised of at least one port, having a tube. The tube can have applied thereto the aforementioned cold spray of an alkaline oxide or an oxide material doped with alkali metal or alkaline earth compounds mixed with small quantity of metal, the application occurring either during the application of a cold spray to principal surfaces within the chamber or during a separate applying step.

In still additional exemplary embodiments, the cold spray can be directed to at least an inner surface of a tube and/or least an outer surface of the tube. The tube (or tubes) can protrude into the hydrogen generation reactor chamber or be flush or adjacent the inner surfaces of the hydrogen generation reactor chamber.

In some embodiments a catalyst is deposited on a support structure comprising at least one of metal foams, ceramic monoliths, foams, or mesochannels. The method can also include spraying a hydrogen generation reactor chamber cover, the cover having applied thereto a cold spray of an alkaline oxide mixed with small quantity of metal. In particular embodiments, the cover also has a hydrogen separation membrane incorporated.

In particular embodiments, spray coating to coat the walls, base of the chamber, etc, can be applied so as to leave an uncoated perimeter for joining using welding and other joining techniques such as brazing or diffusion bonding.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appendent claims.

Figure 1:
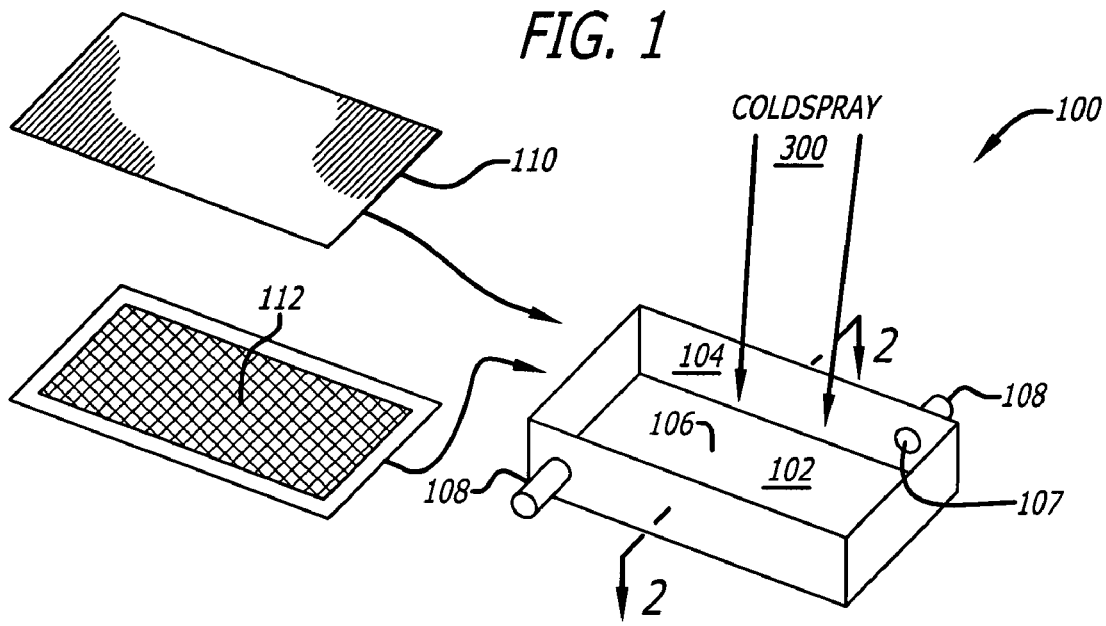
FIG. 1 illustrates a perspective view of an exemplary open metal hydrogen generation reactor chamber.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE PREFERRED EMBODIMENTS

According to one embodiment of the present invention, a method for preparing the metal substrate surface of a hydrogen generation reactor chamber to reduce carbon formation is provided.

The present invention discloses a method of producing a hydrogen generation reactor chamber with reduced carbon formation on inner reactor surfaces.

An exemplary reactor chamber 100 shown in FIG. 1 is a metal box with a floor 102, a side wall 104 surrounding the floor 102. While the exemplary reactor chamber shown has a rectangular shape, any hydrogen generation reactor chamber having useful geometry may be utilized, in accordance with the teachings of the present invention. For, example, cold spray may be applicable to coating large diameter tubular reactors. For diameters greater than 5 inches, there is no restriction in length of the tubing. For diameters <2 inches, length may be restricted to about 5 inches.

The focus of this invention is the inner surface 106 of the reactor chamber exemplified by the surface of floor 102. The inner surface can be any surface defined by or within exemplary reaction chamber 100. The inner surface 106 has a principal surface (shown in FIG. 2). Tubes forming ports 108 communicate with reactor chamber 100 from the outside to the inside. The tubes are also constructed of metal substrates and may be in communication with reactor chamber 100 in any configuration known to those of ordinary skill in the art.

Reactor chamber 100 shown in FIG. 1 is depicted in an open state to illustrate the application of a cold spray 300. A cover 110 is added to the chamber to close off the reactor chamber 100 during operation. Catalysts deposited on a support structure such as metal foams, ceramic monoliths or foams, or mesochannels (having flow channel(s) widths in about the 0.3 mm to 2.5 mm range, preferably in about the 0.5 mm to about 2.0 mm range) are mounted or formed as part of the reactor chamber 100 before the cover 110 is attached. In some instances, the catalysts may be packed into the reactor in the form of particles or pellets; the mesochannels may also be packed with catalyst powders. In some instances, the cover 110 may also have a hydrogen separation membrane 112 incorporated therein.

The reactor chamber 100 and metal components such as ports 108 are constructed out of metal substrate. Suitable metal substrates include aluminum, stainless steel (austenitic steels such as Type 304, 316, 321, 330), Inconel®, titanium or other refractory alloys suitable for high temperature applications such as Hastelloy® grade alloys. Inconel® refers to a family of trademarked high strength austenitic nickel-chromium-iron alloys that have exceptional anti-corrosion and heat-resistance properties. Exemplary alloys include, under the trade names Inconel 600, 625, X; Hastelloy C, G, X, cast stainless steel such as HK (nominal composition of essential elements C 0.2-0.6, Mn 2.0 max, Si 2.0 max, Cr 24-28, Ni 18-22, Fe bal). Also Inconel 600 (nominal composition of essential elements: Ni(+Co) 76.4, C 0.04, Mn 0.2, Fe 7.2, S 0.007, Si 0.2, Cu 0.10, Cr 15.85), Inconel 625 (nominal composition of essential elements: Ni (+Co) 62.6 C 0.05, Mn 0.55, Fe 6.85, S 0.007, Si 0.35, Cu 0.05, Cr 20, Al 0.15, Ti 0.3, Cb(+Ta) 3.95, Inconel X (nominal composition of essential elements: Ni (+Co) 72.85, C 0.04, Mn 0.65, Fe 6.80, S 0.007, Si 0.3, Cu 0.05, Cr 15.15 Al 0.75, Ti 2.5, Cb (+Ta) 0.85);

Hastelloy C (nominal composition of essential elements: Ni bal, Mo 16, Cr 16, Fe 5, W 4, Mn, Si), Hastelloy G (nominal composition of essential elements: Ni 44, Cr 22, Fe 20, Mo 6.5, Cb+Ta 2.1, Cu 2.0, C 0.05 max, W 1 max);

Hastelloy X (nominal composition of essential elements: Co 1.5 max, Fe 18.5, Cr 22.0, Mo 9.0, W 0.6, C 0.15 max (wrought), C 0.2 max (cast), Ni bal)

To prepare the metal substrate forming the inner surface 106 of the reactor chamber and/or the inner surfaces of the ports 107 for reduced coking during hydrogen generation, the metal substrates are modified by exposing the metal substrates to a cold spray containing materials that prevent carbon formation. In some instances, tubings, comprising ports 108, may protrude into the reactor chamber 100 and external surfaces of the tubings can also be coated. Any other protrusions (tubings, thermowells, wells for other sensor probes, etc.) into the body may be coated.

Figure 2:
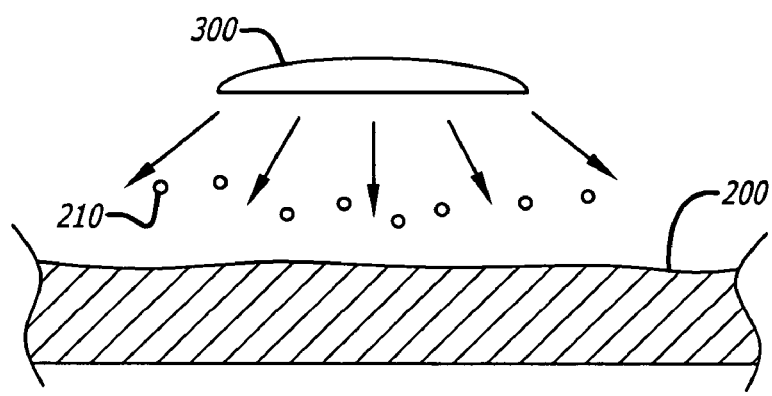
FIG. 2 illustrates a cross-sectional view along line 2-2 of the metal substrate shown in FIG. 1 being exposed to a cold spray.

As shown in FIGS. 1 and 2 the cold spray 300 is used to apply a coating to the inner surfaces 106. Application of the coating is by spraying a gas with fill material particles therein and is typically a high-velocity flow of a material in solid state. It becomes a gas-fill mixture upon spraying 210.

The term "cold spray" comes from the fact that the temperature at which the spray is occurring is lower than the melting point of the material. One suitable fill material for reducing carbon deposition in a hydrogen generation reactor chamber is alumina doped with alkali metal or alkaline earth components. For example, Saint-Gobain Norpro (Akron, Ohio) provides an exemplary support material that contains the following: >92% alumina, 0.55% Silica, 4.5% CaO and 1% MgO. Alumina containing potassium in the form of kalsilite may also be used. These dopants promote steam adsorption during reforming and thus carbon gasification reactions. Exemplary doped alumina powder about 1 to about 50 microns in size is appropriate. The gas-fill mixture 210 therefore contains the doped alumina mixed with a metal to provide ductility. Ductility is a property of metals that enables them to be mechanically deformed and form a coating using the cold spray technique.

An advantage of utilizing a cold spray method is that the particle size of the material can be several microns in size. Applications of coatings using other methods, while useful, such as wash coating, spray coating etc. are best conducted when the particle size is less than one micron, and therefore requires size reduction using wasteful and time consuming methods such as ball milling.

The metal used to provide ductility can be a mixture of transition metals, preferably containing minor quantities of noble metals (such as gold, silver, platinum, rhodium, palladium, ruthenium, osmium, and iridium). A percentage of between about 50% and about 90% metal in the gas-fill mixture 210 is suitable. It is also possible that a doped alumina-metal precursor may be desirable in preference to a physical mixing of doped alumina and metal powders.

Reactor materials are chosen to accommodate operating temperatures. The nature of metals in the oxide-metal mixture that is being cold sprayed will also depend on the operating temperature. The operating temperature is a function of the method of hydrogen generation that is being employed (partial ox->850, steam reforming about 700 to about 800 C, autothermal reforming about 700 to about 850 C). Some metals would not be suitable for high temperature operations, such as, for example, ruthenium which has a tendency to vaporize at about 650 C. For low temperature operation such as methanol reforming (<300 C), aluminum can be utilized.

The gas-fill material mixture 210 is imparted at velocities of about 300 to about 1200 m/s to provide adequate kinetic energy to the sprayed material to cause bonding. Suitable carrier gases include air, nitrogen, helium as practiced by KTech Corporation of Albuquerque, N. Mex. Applying corrosion resistance coatings, conductive coatings or for metallization of plastics is one suitable cold spray process for applying the material.

The kinetic energy of the impact of the fill material on the metal substrate is spent for high-speed plastic deformation of the interacting fill material and metal substrate.

Figure 3:
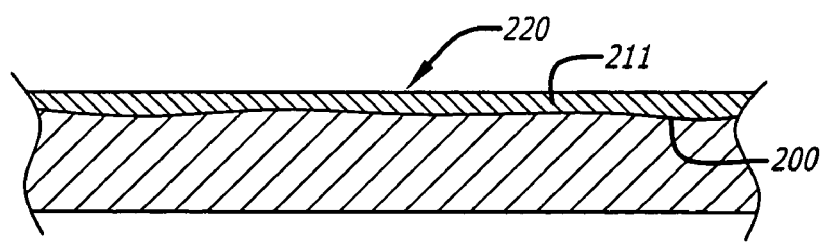
FIG. 3 illustrates a cross-sectional view of the metal substrate shown in FIG. 2 after exposure to the cold spray.

Shown in FIG. 2, in cross-section, is the application of a cold spray stream of a gas-fill mixture 210 directed at an exemplary surface 200 of the reactor chamber 100. Shown in FIG. 3 is an enlarged cut away view of the exemplary surface 200 of the reactor chamber 100 after the application of a cold spray. Exemplary surface 200 is coated with a layer 211 from the cold spray material mixture 210 forming a coated principal surface 220, as depicted in FIG. 3.

The application of coatings using cold spray, according to the teachings of the invention, can also be used prevent deterioration of metal components due to nitriding, corrosion or sulfidation. The selection of materials that are resistant to attack by processes such as nitriding, sulfidation and corrosion is important to lifetime thermal cycling and reliability issues critical for high-temperature services such as hydrogen generation. While exotic alloys can withstand chemical attack under reforming conditions, they are expensive and difficult to machine. As an alternative, less expensive materials such as austenitic steel (for example, SS 304 and/or 316) can be made to be resistant to attack by the application of suitable coatings.

Nitriding of metal components is a major concern when hydrogen is produced by decomposition or cracking of ammonia. The decomposition of ammonia to hydrogen proceeds via the formation of N* and NH* intermediate species, and in the absence of oxygen (which is the case in ammonia crackers), these species are excellent nitriding agents. Eventually, nitriding leads to failure of the metal via embrittlement. As described by Elliott ("*Choose Materials for High-Temperature Environments*" Chemical Engineering Progress, p. 75 February 2001, herein incorporated by reference) materials containing high iron contents, such as stainless steel SS 316, contains about 70% Fe, about 18% and about 8% Ni, are particularly vulnerable to nitriding. Materials containing high nickel content such as Inconel (Inconel 600 alloy contains 76%, Ni+Co) are more resistant to nitriding but are difficult to machine. As disclosed herein, coating stainless steel metal with a mixture comprising $Al_2O_3$ containing aluminum (>5% in oxide metal mixture) or nickel (>30%) using cold spray can make these non-exotic materials more resistant to nitriding and suitable for hydrogen production, for example, via ammonia cracking.

When hydrogen is produced by ammonia cracking it is desirable to catalytically combust a portion of the ammonia feed to support the endothermic ammonia cracking reaction. An integrated reformer-combustor design can be used to improve thermal efficiencies. The combustor is vulnerable to corrosion due to the ammonia-water (formed by combustion) mixture that is present in the combustor. As in the reformer, exotic materials may be used to mitigate corrosion. An alternative would be to coat the combustor walls using in oxide metal-coating that is deposited by cold spray. Coating a stainless steel metal with a mixture comprising $Al_2O_3$ containing nickel (>30%) using cold spray can make these non-exotic materials more resistant to corrosion and suitable for hydrogen production via ammonia cracking.

Hydrocarbon fuels contain sulfur compounds in varying amounts and constituents. In some cases, the sulfur compounds need to be removed upstream of the reformer (before the fuel is fed into the reformer); for example, when the reformer is operated as a membrane reformer, as sulfur irreversibly poisons the palladium based hydrogen separation membranes. This subsequently leads to a drastic reduction in hydrogen permeation.

The removal of the heavy sulfur compounds from liquid fuels is a challenging problem as these fuels can be processed at high temperatures using steam reforming, autothermal reforming or partial oxidation; the latter two are preferred. Typical operating temperatures are > about 700° C. and the more preferably between about 800 and 900° C. At these temperatures, heavy sulfur compounds are decomposed to lighter sulfur compounds such as $H_2S$ and $SO_x$, which are removed downstream of the hydrogen reformer/reactor using an absorbant bed. These light with sulfur compounds can be very damaging, as scale formation (spalling) can occur. In contrast to nitriding, stainless steel and alloys containing high iron content are preferred over high nickel containing alloys.

Coating stainless steel metal with a mixture comprised of $Al_2O_3$ containing aluminum (>5% in oxide metal mixture) or iron (>30%) using a cold spray, can make these non-exotic materials more resistant to sulfidation and suitable for hydrogen generation components. The combination of a reactor whose metal components are resistant to sulfidation, combined with a catalyst that is tolerant to sulfur compounds can permit a reduction in the operating temperature required (from about 850° C. to about 650° C.) for hydrogen generation from sulfur containing liquid fuels.

Since certain changes may be made in the above apparatus without departing from the scope of the invention herein involved, it is intended that all matter contained in the above description, as shown in the accompanying drawing, shall be interpreted in an illustrative, and not a limiting sense. It is not intended that the invention be limited to the illustrative embodiments.

What is claimed is:

1. A method for preparing a hydrogen generation reactor chamber to reduce coking, the method comprising:
    applying a cold spray of (a) an alkaline oxide mixed with metal or (b) oxides doped with alkali metal or alkaline earth compounds, mixed with metal, to at least one surface within the chamber.

2. The method of claim 1 wherein the metal is selected from the group consisting of noble metals and transition metals.

3. The method of claim 1 wherein the percentage of metal to alkaline oxide in the cold spray is about 50% to about 90%, respectively.

4. The method of claim 1 wherein said hydrogen generation reactor chamber is comprised of at least one of aluminum, stainless steel, titanium and high temperature refractory alloys suitable for hydrogen generation.

5. The method of claim 1 wherein said hydrogen generation reactor chamber is further comprised of at least one port having a tube.

6. The method of claim 5 further comprising a step of applying a cold spray of an alkaline oxide mixed with metal or oxides doped with alkali metal, or alkaline earth compounds, mixed with metal to a surface of said tube, said application to said tube occurring either during said application of said cold spray to principal surfaces within the chamber or during a separate applying step.

7. The method of claim 6 wherein said applying step is directed to at least an inner surface of said tube.

8. The method of claim 6 wherein said applying step is directed to at least an outer surface of said tube.

9. The method of claim 6 wherein said tube protrudes into said hydrogen generation reactor chamber.

10. The method of claim 1 wherein said hydrogen generation reactor chamber has a cover, said cover having applied thereto a cold spray of an alkaline oxide mixed with small quantity of metal.

11. The method of claim 10 wherein said cover also has a hydrogen separation membrane incorporated therein.

12. The method of claim 1, wherein said cold spray is applied to leave portions of said hydrogen generation reactor chamber uncoated for joining operations.

13. The method of claim 12, wherein said joining operations comprise at least one of welding, brazing or diffusion bonding.

14. The method of claim 1, further comprising applying said cold spray to any protrusion into said hydrogen generation reactor chamber.

15. The method of claim 14, wherein said protrusions is at least one of tubings, thermowells and wells for sensor probes.

16. The method of claim 1 wherein said hydrogen generation reactor chamber is tubular.

17. The method of claim 16 wherein said tubular hydrogen generation reactor chamber has covers or end-caps that contain one or more tubes.

18. A method of fabricating a low temperature hydrogen generation reactor chamber for reduced carbon accumulation, the method comprising:
    applying a cold spray of (a) alkali metal and an alkaline oxide mixed with metal or (b) oxides or alkaline earth compounds, mixed with metal to at least one surface within the chamber.

19. A method of preparing a hydrogen generation reactor chamber to reduce carbon formation on an inner surface of the hydrogen generation reactor chamber, the method comprising:
    applying a cold spray of (a) an alkaline oxide mixed with metal or (b) oxides doped with alkali metal or alkaline earth compounds, mixed with metal, to the inner surface of the hydrogen generation reactor chamber.

20. A method of preparing a low temperature hydrogen generation reactor chamber to reduce carbon formation on an inner surface of the hydrogen generation reactor chamber, the method comprising:
    spraying a gas-fill mixture, comprising (a) an alkaline oxide mixed with metal or (b) oxides doped with alkali metal or alkaline earth compounds, mixed with metal, to the inner surface of the hydrogen generation reactor chamber.

* * * * *